United States Patent
Son et al.

(10) Patent No.: US 7,535,821 B2
(45) Date of Patent: May 19, 2009

(54) METHOD FOR GENERATING TWO-DIMENSIONAL ORTHOGONAL VARIABLE SPREADING CODE AND MIMO SYSTEM USING THE SAME

(75) Inventors: Ho-Kyung Son, Daejon (KR); Jong-Ho Kim, Daejon (KR); Yong-Seok Choi, Daejon (KR); Chang-Joo Kim, Daejon (KR); Moon-Ho Lee, Jeonju-si (KR); Kwang-Jae Lee, Suncheon-si (KR); Jia Hou, Jeonju-si (KR)

(73) Assignees: Electronics and Telecommunications Research Institute, Daejon (KR); Industrial Cooperation Chonbuk National University, Jeonju-si, Jeollabuk-do (KR)

( * ) Notice: Subject to any disclaimer, the term of this patent is extended or adjusted under 35 U.S.C. 154(b) by 536 days.

(21) Appl. No.: 11/175,692

(22) Filed: Jul. 7, 2005

(65) Prior Publication Data
US 2006/0171294 A1 Aug. 3, 2006

(30) Foreign Application Priority Data
Feb. 2, 2005 (KR) ............... 10-2005-0009331
Mar. 14, 2005 (KR) ............... 10-2005-0021139

(51) Int. Cl.
*H04J 11/00* (2006.01)
(52) U.S. Cl. ............................................. 370/208
(58) Field of Classification Search ............ 370/208
See application file for complete search history.

(56) References Cited

U.S. PATENT DOCUMENTS

2003/0210648 A1* 11/2003 Yang et al. ............... 370/208
2004/0165558 A1* 8/2004 Ling et al. ............... 370/334
2005/0020237 A1* 1/2005 Alexiou et al. ............ 455/403
2006/0034381 A1* 2/2006 Ionescu et al. ............ 375/267

FOREIGN PATENT DOCUMENTS

| KR | 1020030081744 | 10/2003 |
|---|---|---|
| KR | 1020040048700 | 6/2004 |
| KR | 1020060065355 | 6/2006 |

OTHER PUBLICATIONS

F. Adachi, et al.; "Tree structures generation of orthogonal spreading codes with different lengths for forward link of DS-CDMA mobile radio"; Electronics Letters vol. 33, No. 1; Jan. 2, 1997; pp. 27-28.

(Continued)

*Primary Examiner*—Charles N Appiah
*Assistant Examiner*—Yungsang Lau
(74) *Attorney, Agent, or Firm*—Lowe Hauptman Ham & Berner, LLP

(57) ABSTRACT

Provided are a method for generating a two-dimensional orthogonal variable spreading code and a Multiple Input Multiple Output (MIMO) system using the same. The MIMO system can increase a communication capacity in an asynchronous multiple user system as well as a synchronous system in a wideband-Code Division Multiple Access (CDMA). The MIMO system includes: a transmitting block for temporally and spatially encoding a plurality of user data, spreading the user data into orthogonal channel signals, and transmitting them to antennas; and a receiving block for receiving the orthogonal channel signals and performing temporal and spatial decoding and despreading on them. Herein, the transmitting block includes: a space time code (STC) encoding unit for generating and outputting a predetermined number of STC streams; and a jacket orthogonal variable spreading function (JOVSF) channel code spreading unit for spreading the STC streams into orthogonal channel signals by using a JOVSF.

22 Claims, 12 Drawing Sheets

OTHER PUBLICATIONS

Moon Ho Lee; "A New Reverse Jacket Transform and Its Fast Algorithm"; IEEE Trans. On Circuit and System 2; vol. 47; No. 1; Jan. 2000; pp. 1-24.

Moon Ho Lee; "Fast Block Center Weighted Hadamard Transform"; IEEE Transactions on Circuits and System; vol. 54, No. 12; Dec. 2007; pp. 25-83.

* cited by examiner (a) HOVSF Construction  (b) JOVSF Construction

Autocorrelations of HOVSF

Autocorrelations of JOVSF

Crosscorrelations of HOVSF

Crosscorrelations of JOVSF

METHOD FOR GENERATING TWO-DIMENSIONAL ORTHOGONAL VARIABLE SPREADING CODE AND MIMO SYSTEM USING THE SAME

FIELD OF THE INVENTION

The present invention relates to a method for generating a two-dimensional (2D) orthogonal variable spreading code and a MIMO system using the same; and, more particularly, to method for generating a Jacket Orthogonal Variable Spreading Function (JOVSF), which is a 2D orthogonal variable spreading code, to use orthogonal multiple code efficiently for different users in a multiple user system, such as a wideband Code Division Multiple Access (W-CDMA) system, and a Multiple Input Multiple Output (MIMO) system using the JOVSF.

DESCRIPTION OF RELATED ART

It is expected that burst data occupy most traffics in the next-generation wireless system, and this has a great difference from the second-generation mobile communication system where speech traffics occupy most traffics. In order to access to multimedia application mixed data, diverse data transmission rates should be provided to each user. In response to the requirement, third-generation wireless mobile systems adopting a wideband Code Division Multiple Access (W-CDMA) technology, such as Universal Mobile Telecommunications System (UMTS)/International Mobile Telecommunication (IMT-2000), support variable data transmission rates for multimedia application and high data transmission rates.

In a direct sequence CDMA (DS-CDMA) system, a unique signature code is allocated to each user and orthogonal codes are allocated to forward channels. Also, in the second-generation wireless CDMA system, such as IS-95, a single orthogonal constant spreading factor (OCSF) is allocated to each mobile user.

To support a data transmission rate higher than that of the DS-CDMA system, multicode CDMA (MC-CDMA) technology which allocates a plurality of OCSFs to each user and Orthogonal Variable Spreading Factor (OVSF) CDMA (OVSF-CDMA) technology which allocates one OVSF to each user are used.

The MC-CDMA has an advantage that it can obtain an excellent spectrum efficiency in general, but it has a problem that it requires a plurality of transmitters and increases complexity in terms of hardware.

On the other hand, the OVSF-CDMA needs only one transmitter and thus it can resolve the problem of the MC-CDMA. Researchers study the OVSF-CDMA to broaden a communication capacity in the multiple user system that requires diverse data transmission rates. This is revealed in an article by F. Adachi, M. Sawahashi, and K. Okawa, entitled "Tree-structured generation of orthogonal spreading codes with different lengths for forward link of DS-CDMA mobile radio," *IEE Electronics Letters*, Vol. 33, No. 1, January 1997, pp. 27-28, and an article by P. Z. Fan and M. Darnel, entitled "Sequence design for communications applications," John Wiley, Inc., 1996.

The OVSF has an advantageous property that it supports a variable data transmission rate and variable spreading, but it has a problem that it can reveal its optimal performance only when it is assumed that perfect synchronization is maintained between a transmitter and a receiver. The maintenance of synchronization between the transmitter and the receiver is very important in order to maintain the orthogonal property. Due to the problem, codes such as complex orthogonal spreading code are suggested to obtain excellent performance in an asynchronous environment. However, those codes, which have an advantage that they have the optimal correlation property, have shortcomings that they cannot support the variable transmission rate. Therefore, they can hardly be applied to an asynchronous system and a Multiple Input Multiple Output MIMO system.

SUMMARY OF THE INVENTION

It is, therefore, an object of the present invention to provide a Multiple Input Multiple Output (MIMO) system using a two-dimensional (2D) orthogonal variable spreading code that can increase a communication capacity in an asynchronous multiple user system as well as a synchronous system by efficiently applying orthogonal multiple codes having excellent correlation properties to different users in a wideband-Code Division Multiple Access (CDMA).

It is another object of the present invention to provide a method for generating a jacket orthogonal variable spreading function (JOVSF), which is a 2D orthogonal variable spreading code, that can maintain excellent correlation properties without losing an orthogonal property even in a variable spreading system that supports a variable data transmission rate, such as an MIMO system, and a channel code spreading/despreading apparatus using the JOVSF generating method, and an MIMO system including the same.

In accordance with an aspect of the present invention, there is provided an MIMO system using a two-dimensional orthogonal variable spreading code, the system which includes: a transmitting block for temporally and spatially encoding a plurality of user data, spreading the user data into orthogonal channel signals, and transmitting the orthogonal channel signals to a plurality of antennas; and a receiving block for receiving the orthogonal channel signals transmitted from the transmitting block through the antennas, and performing temporal and spatial decoding and despreading on the orthogonal channel signals, wherein the transmitting block includes: a space time code (STC) encoding block for generating and outputting a predetermined number of STC streams by temporally and spatially encoding the user data; and a JOVSF channel code spreading block for spreading the STC streams inputted from the STC encoding block into orthogonal channel signals by using a JOVSF, which is a two-dimensional orthogonal variable spreading code.

In accordance with another aspect of the present invention, there is provided an apparatus for spreading a channel code by using a two-dimensional orthogonal variable spreading code, the apparatus including: a JOVSF generating block for generating a JOVSF, which is a two-dimensional orthogonal variable spreading code; and a JOVSF spreading block for spreading a stream inputted from outside into an orthogonal code channel signal based on the JOVSF generated in the JOVSF generating block.

In accordance with another aspect of the present invention, there is provided an apparatus for despreading a channel code by using a two-dimensional orthogonal variable spreading code, the apparatus including: a JOVSF generating block for generating a JOVSF, which is a two-dimensional orthogonal variable spreading code; and a JOVSF despreading block for despreading a signal inputted from outside into an orthogonal code channel signal by multiplying the signal by the JOVSF generated in the JOVSF generating block.

In accordance with another aspect of the present invention, there is provided a method for generating a two-dimensional orthogonal variable spreading code which is used for spreading or despreading of a channel code, the method including: a) receiving a jacket matrix and a substitution matrix; b) generating a seed of a root of a JOVSF, which is a two-dimensional orthogonal variable spreading code, by performing multiplication on the jacket matrix and the substitution matrix; and c) generating a JOVSF by receiving the JOVSF seed and performing Kronecker operation.

In addition, the JOVSF of the present invention is an OVSF having a new structure based on a jacket matrix. It includes two regions: One is a conventional binary spreading code, i.e., a part the same as the Hadamard orthogonal variable spreading function (HOVSF), and the other is a poly-phase OVSF which is orthogonal to the HOVSF.

BRIEF DESCRIPTION OF THE DRAWINGS

The above and other objects and features of the present invention will become apparent from the following description of the preferred embodiments given in conjunction with the accompanying drawings, in which.

DETAILED DESCRIPTION OF THE INVENTION

Other objects and aspects of the invention will become apparent from the following description of the embodiments with reference to the accompanying drawings, which is set forth hereinafter.

Figure 1:
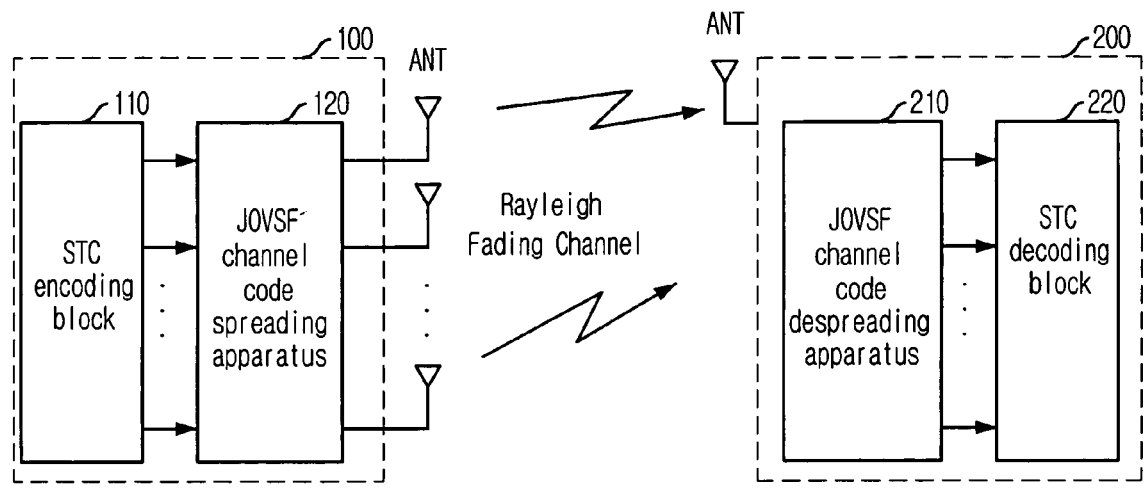
FIG. 1 is a block diagram showing an entire Multiple Input Multiple Output (MIMO) system using a two-dimensional Jacket Orthogonal Variable Spreading Function (JOVSF) in accordance with an embodiment of the present invention.

FIG. 1 is a block diagram showing an entire Multiple Input Multiple Output (MIMO) system using a two-dimensional Jacket Orthogonal Variable Spreading Function (JOVSF) in accordance with an embodiment of the present invention. As shown, the MIMO system using the two-dimensional JOVSF includes a transmitting porting 100 for performing Space Time Code (STC) encoding, spreading them into orthogonal channel signals and transmitting the orthogonal channel signals to a plurality of antennas; and a receiving portion 200 for receiving the signals transmitted through a Rayleigh fading channel through an antenna and performing STC decoding and despreading.

The transmitting portion 100 includes an STC encoding block 110 for performing STC encoding on user data transmitted from a plurality of users, and a JOVSF channel code spreading apparatus 120 for spreading the signals from the STC encoding block 110 into two-dimensional orthogonal channel signals by using the JOVSF.

The receiving portion 200 includes a JOVSF channel code despreading apparatus 210 for despreading the signals received through an antenna by using the JOVSF, and an STC decoding block 220 for performing STC decoding on the signals inputted from the JOVSF channel code despreading apparatus 210.

Since a general STC encoding block and a general STC decoding block of an MIMO system can be used for the STC encoding block 110 and the STC decoding block 220 presented in the present embodiment, further description on them will not be provided herein.

Figure 2:
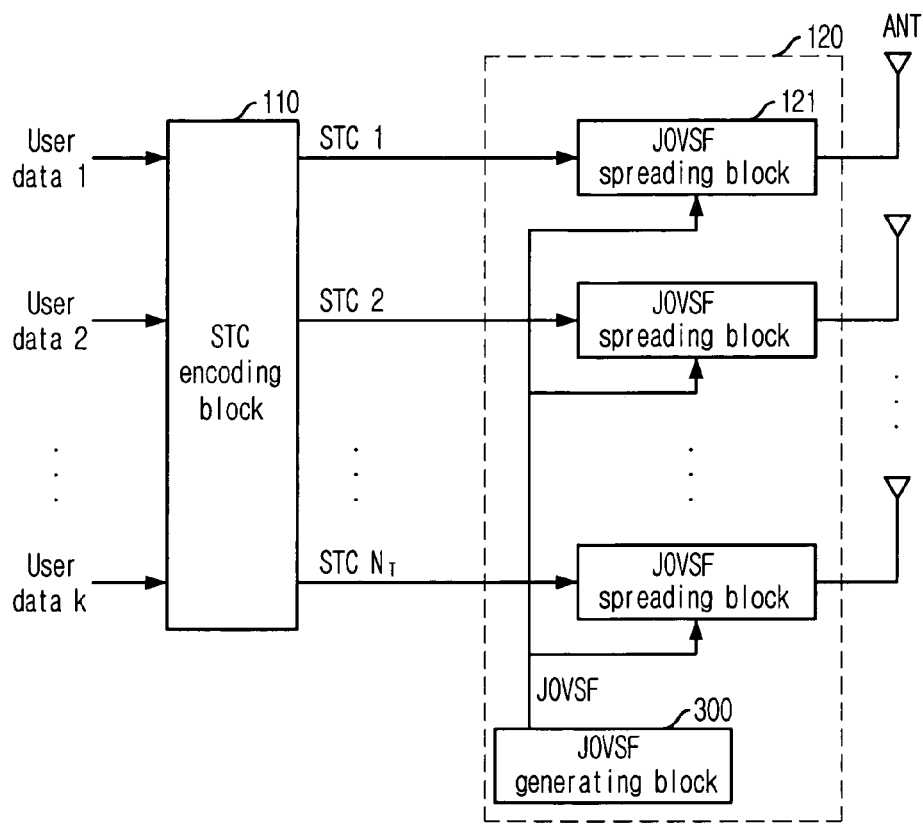
FIG. 2 is a block diagram illustrating a JOVSF channel code spreading apparatus in accordance with an embodiment of the present invention.

FIG. 2 is a block diagram illustrating the JOVSF channel code spreading apparatus 120 in accordance with an embodiment of the present invention. As shown, the JOVSF channel code spreading apparatus 120 of the present invention includes JOVSF spreading blocks 121 for spreading an input stream into orthogonal code channel signals, and a JOVSF generating block 300 for generating a JOVSF.

The STC encoding block 110 performs conventional operation of generating $N_T$ output streams STC 1, STC 2, . . . , STC $N_T$ by performing temporal and spatial encoding on k user data.

The JOVSF spreading blocks 121 receives the output streams, i.e., STC streams, individually, forms orthogonal code channel signals by spreading the STC streams by using the JOVSF inputted from the JOVSF generating block 300, and transmits the orthogonal code channel signals to corresponding antennas.

Figure 3:
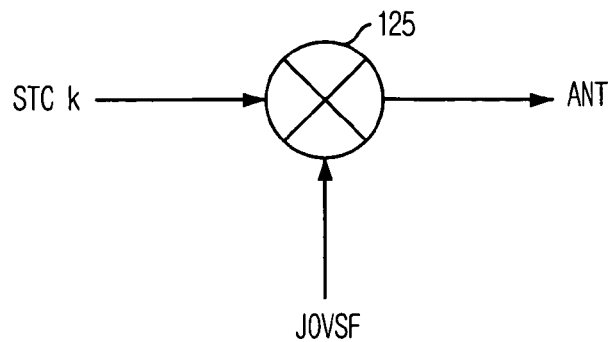
FIG. 3 is a diagram describing a JOVSF spreading block in accordance with an embodiment of the present invention.

FIG. 3 is a diagram describing a JOVSF spreading block 121 in accordance with an embodiment of the present invention. As shown, the JOVSF spreading block 121 can be realized by using a multiplying unit 125.

In short, the orthogonal code channel signals can be obtained by multiplying an STC stream temporally and spatially encoded and outputted from the STC encoding block 110 by the JOVSF inputted from the JOVSF generating block 300 in the multiplying unit 125.

Figure 4:
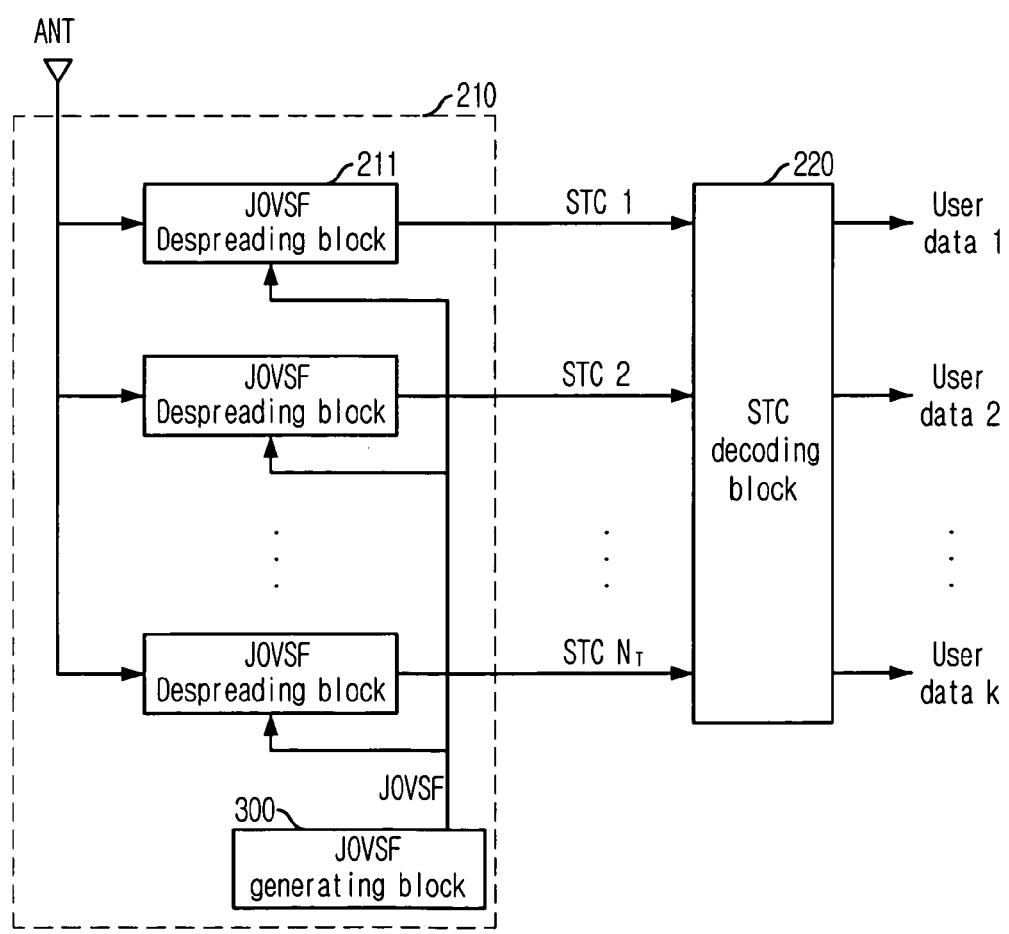
FIG. 4 is a block diagram illustrating a JOVSF channel code despreading apparatus in accordance with an embodiment of the present invention.

FIG. 4 is a block diagram illustrating the JOVSF channel code despreading apparatus 210 in accordance with an embodiment of the present invention. As shown, the JOVSF channel code despreading apparatus 210 includes a plurality of JOVSF despreading blocks 211 for despreading input signals and outputting STC streams and the JOVSF generating block 300.

The $N_T$ JOVSF despreading blocks 211 generate and output STC streams by despreading the signals inputted through the antennas based on the JOVSF inputted from the JOVSF generating block 300. Thus, the STC decoding block 220 can temporally and spatially decode the $N_T$ despread output streams and restore k user data.

Figure 5:
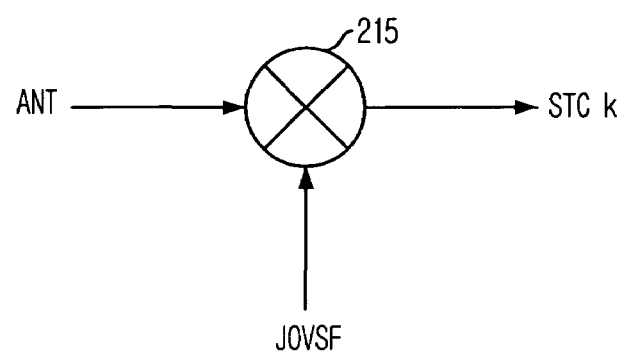
FIG. 5 is a diagram showing a JOVSF despreading block in accordance with an embodiment of the present invention.

FIG. 5 is a diagram showing a JOVSF despreading block 211 in accordance with an embodiment of the present invention. As shown, the JOVSF despreading block 211 of the present invention can be realized by using a multiplying unit 215.

The despread STC stream can be obtained by multiplying the signal received through an antenna by the JOVSF generated in the JOVSF generating block 300, which is the same as the JOVSF used in the transmitting portion.

Figure 6:
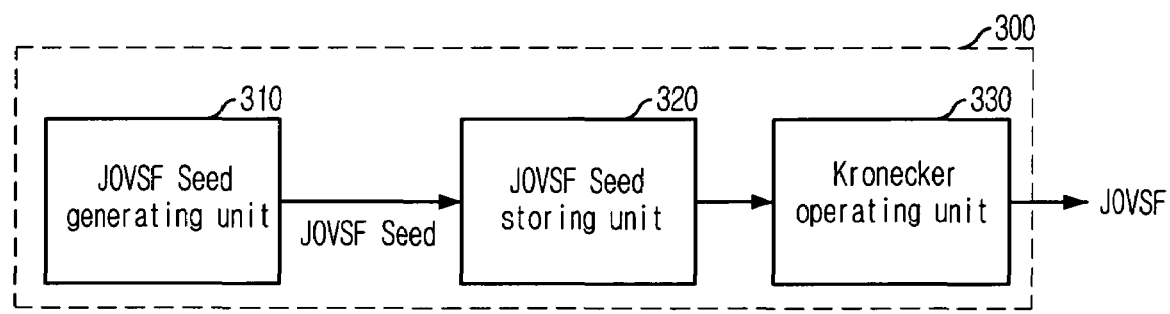
FIG. 6 is a block diagram describing a JOVSF generating block in accordance with an embodiment of the present invention.

FIG. 6 is a block diagram describing the JOVSF generating block 300 in accordance with an embodiment of the present invention. As shown, the JOVSF generating block 300 of the present invention includes a JOVSF seed generating unit 310 for generating a JOVSF seed, a JOVSF seed storing unit 320 for storing the generated JOVSF seed, and a Kronecker operating unit 330 for generating a JOVSF by performing Kronecker operation on the JOVSF seed.

As described above, the above-generated JOVSF is outputted to the JOVSF spreading block 121 or the JOVSF despreading block 211 and used as an orthogonal spreading signal or an orthogonal despreading signal of a code channel.

Figure 7:
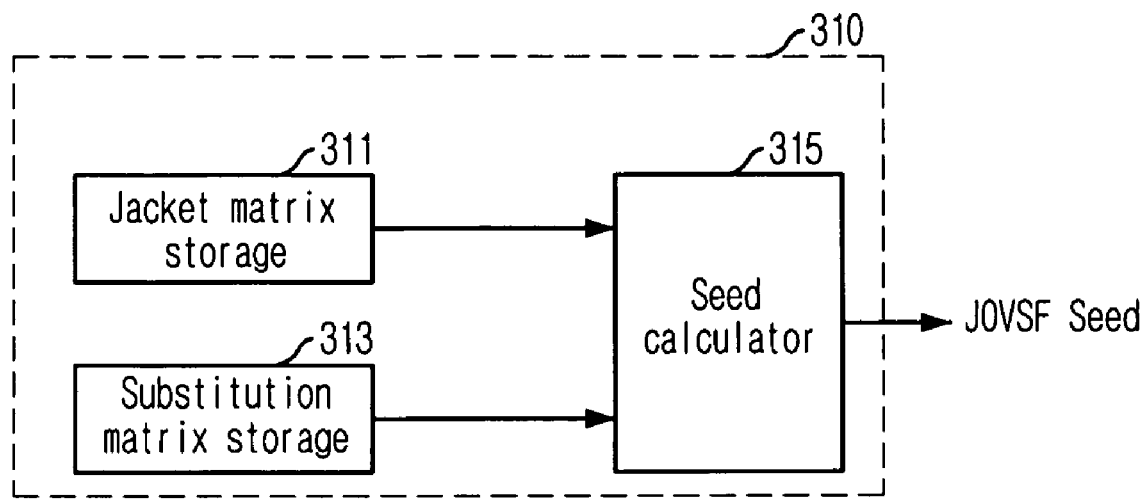
FIG. 7 is a block diagram depicting a JOVSF seed generating unit in accordance with an embodiment of the present invention.

FIG. 7 is a block diagram depicting the JOVSF seed generating unit 310 in accordance with an embodiment of the present invention. As shown, the JOVSF seed generating unit 310 of the present invention includes a jacket matrix storage 311 for storing a jacket matrix, a substitution matrix storage 313 for storing a substitution matrix which includes a column substitution matrix and a row substitution matrix, and a seed calculator 315 for calculating the JOVSF seed by operating multiplication on the jacket matrix and the substitution matrix. The generated JOVSF seed is stored in the JOVSF seed storing unit 320 and used as a seed for the generation of a JOVSF.

Figure 8:
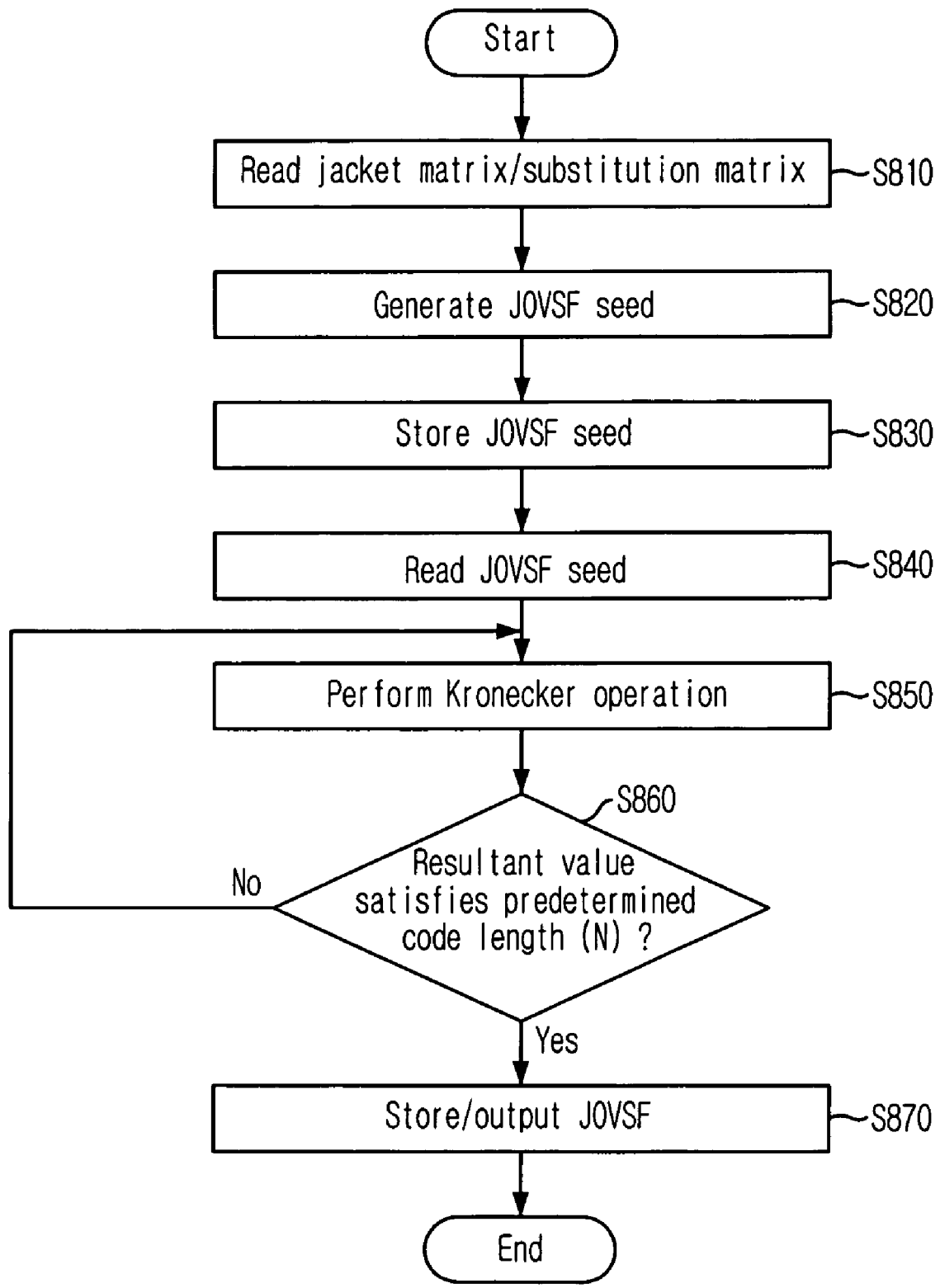
FIG. 8 is a flowchart describing a JOVSF generating process in accordance with an embodiment of the present invention.

FIG. 8 is a flowchart describing a JOVSF generating process in accordance with an embodiment of the present invention. First, at step S810, the seed calculator 315 reads a jacket matrix, a column matrix, and a row matrix stored in the jacket matrix storage 311 and the substitution matrix storage 313. At step S820, a seed of a JOVSF root is generated by performing multiplication of the jacket matrix and the substitution matrix. At step S830, the generated JOVSF seed is stored in the JOVSF seed storing unit 320 and used as a seed for repeated generation of the JOVSF.

Subsequently, at step S840, the Kronecker operating unit 330 reads the JOVSF seed stored in the JOVSF seed storing unit 320 and, at step S850, Kronecker multiplication is carried out.

At step S860, it is determined whether the resultant value of the Kronecker multiplication satisfies a predetermined code length (N). If the resultant value does not satisfy the predetermined code length (N), the Kronecker multiplication is repeated.

If the resultant value satisfies the predetermined code length (N) at the step S860, at step S870, the resultant value is stored in the JOVSF seed storing unit 320 and outputted. Through the repeated operation, a JOVSF of a desired length can be generated, and the generated JOVSF is stored in a memory device or transmitted to the JOVSF spreading apparatus or the JOVSF despreading apparatus to thereby be used as an orthogonal spreading signal or an orthogonal despreading signal.

Hereinafter, a general operation of the MIMO system using the two-dimensional JOVSF will be described in accordance with the present invention. As described above, in the present embodiment, the number of entire users is k; and the number of transmitting antennas is $N_T$. There is one receiving antenna on a Rayleigh fading channel.

A temporal and spatial encoding symbol for an antenna i can be expressed as $S_k^i$, and an Alamouti symbol is considered to acquire transmission diversity of the MIMO system. For example, a temporal and spatial encoding symbol for a $k^{th}$ user can be expressed as follows.

$S_k^1 = [S_{k,1} - (S_{k,2})^*]$ for a transmission antenna 1

$S_k^2 = [S_{k,2} - (S_{k,2})^*]$ for a transmission antenna 2

In accordance with the present invention, a JOVSF code having a length N is allocated to the $k^{th}$ user, where $1 \leq k \leq N$.

A mathematical model of the JOVSF spreading of the transmission antenna 1 can be expressed as equations 1 and 2.

Time 1: 
$$transmit_{1,1} = s_{1,1} \otimes C_N(1) + s_{2,1} \otimes C_N(2) + \ldots + s_{k,1} \otimes C_N(k)$$
$$= \sum_{l=1}^{k} s_{l,1} \otimes C_N(l)$$
Eq. 1

Time 2:
$$transmit_{1,2} = -(s_{1,2})^* \otimes C_N(1) - (s_{2,2})^* \otimes C_N(2) - \ldots - s_{k,2}^* \otimes C_N(k)$$
$$= \sum_{l=1}^{k} -(s_{l,2})^* \otimes C_N(l)$$
Eq. 2

Also, a mathematical model of the JOVSF spreading process in a transmission antenna 2 can be expressed as equations 3 and 4.

Time 1:
$$transmit_{2,1} = s_{1,2} \otimes C_N(1) + s_{2,2} \otimes C_N(2) + \ldots + s_{k,2} \otimes C_N(k)$$
$$= \sum_{l=1}^{k} s_{l,2} \otimes C_N(l)$$
Eq. 3

Time 2:
$$transmit_{2,2} = (s_{1,1})^* \otimes C_N(1) + (s_{2,1})^* \otimes C_N(2) + \ldots + (s_{k,1})^* \otimes C_N(k)$$
$$= \sum_{l=1}^{k} (s_{l,1})^* \otimes C_N(l)$$
Eq. 4 where $h_i$ denotes a transmission signals used in an $i^{th}$ transmission antenna at a $j^{th}$ time; and $C_N(l)$ is a spreading code from the $l^{th}$ JOVSF having a length N.

Received signals can be expressed as equations 5 and 6 based on time 1 and 2.

Time 1:
$$R_1 = h_1 \times transmit_{1,1} + h_2 \times transmit_{2,1}$$
$$= \sum_{l=1}^{k} h_1 s_{l,1} \otimes C_N(l) + \sum_{l=1}^{k} h_2 s_{l,2} \otimes C_N(l)$$
$$= \left( \sum_{l=1}^{k} h_1 s_{l,1} \otimes C_N(l) + h_2 s_{l,2} \otimes C_N(l) \right)$$
Eq. 5

Time 2:                                                          Eq. 6

$$R_2 = h_1 \times transmit_{1,2} + h_2 \times transmit_{2,2}$$
$$= \sum_{l=1}^{k} -h_1(s_{l,1})* \otimes C_N(l) + \sum_{l=1}^{k} h_2(s_{l,1})* \otimes C_N(l)$$
$$= \left(\sum_{l=1}^{k} h_2(s_{l,1})* \otimes C_N(l) - h_1(s_{l,2})* \otimes C_N(l)\right)$$

where $h_i$ denotes a path gain of an $i^{th}$ transmission antenna. Thus, a despreading function for a $t^{th}$ user can be expressed as equations 7 and 8.

Time 1:                                                          Eq. 7

$$\frac{1}{N}R_1 o(C_N(t))^* =$$
$$\frac{1}{N}\left(\sum_{l=1}^{k} h_1 s_{l,1} \otimes C_N(l) + h_2 s_{l,2} \otimes C_N(l)\right) o(C_N(t))^* =$$
$$\frac{1}{N}\left(h_1 s_{t,1} \otimes (C_N(t) o(C_N(t))^*) + h_2 s_{t,2} \otimes (C_N(t) o(C_N(t))^*) + \left(\sum_{l=1,l \neq t}^{k} h_1 s_{l,1} \otimes (C_N(l) o C_N(t)^*) + h_2 s_{l,2} \otimes (C_N(l) o C_N(t)^*)\right)\right)$$

Time 2:                                                          Eq. 8

$$\frac{1}{N}R_2 o(C_N(t))^* =$$
$$\frac{1}{N}\left(\sum_{l=1}^{k} h_2(s_{l,1})^* \otimes C_N(l) - h_1(s_{l,2})^* \otimes C_N(l)\right) o(C_N(t))^* =$$
$$\frac{1}{N}\left(h_2(s_{t,1})^* \otimes (C_N(t) o(C_N(t))^*) - h_1(s_{t,2})^* \otimes (C_N(t) o(C_N(t))^*) + \left(\sum_{l=1,l \neq t}^{k} h_2(s_{l,1})^* \otimes (C_N(l) o C_N(t)^*) - h_1(s_{l,2})^* \otimes (C_N(l) o C_N(t)^*)\right)\right)$$

where $C_N(t) o C_N(t)^*$ and $C_N(l) o C_N(t)^*$ are expressed as equations 9 and 10.

$$C_N(t) o C_N(t)^* = \sum_{i=1}^{N} a(t)_i a(t)_i^* = R_t(0) = N \quad \text{Eq. 9}$$

$$C_N(l) o C_N(t)^* = \sum_{i=1}^{N} a(t)_i b(t)_i^* = C_{l,t}(0) = 0 \quad \text{Eq. 10}$$

where $a(t)_i$ and $b(t)_i$ denote $i^{th}$ elements of sequences $C_N(t)$ and $C_N(l)$, respectively.

When it is assumed that synchronization is achieved perfectly, the equations 7 and 8 can be expressed as equations 11 and 12 below based on the equations 9 and 10.

$$\frac{1}{N}R_1 o(C_N(t))^* = \quad \text{Eq. 11}$$
$$\frac{1}{N}(h_1 s_{t,1} \otimes (C_N(t) o(C_N(t))^*) + h_2 s_{t,2} \otimes (C_N(t) o(C_N(t))^*) =$$
$$h_1 s_{t,1} + h_2 s_{t,2}$$

$$\frac{1}{N}R_2 o(C_N(t))^* = \quad \text{Eq. 12}$$
$$\frac{1}{N}(h_2(s_{t,1})^* \otimes (C_N(t) o(C_N(t))^*) - h_1(s_{t,2})^* \otimes (C_N(t) o(C_N(t))^*) =$$
$$h_2(s_{t,1})^* - h_1(s_{t,2})^*$$

After all, user data of an $i^{th}$ user can be temporally and spatially decoded based on the following equations 13 and 14 to simply acquire transmission diversity.

$$\left(\frac{1}{N}R_1 o(C_N(t))^*\right) \times h_1^* + \left(\frac{1}{N}R_2 o(C_N(t))^*\right)^* \times h_2 = \quad \text{Eq. 13}$$
$$(|h_1|^2 + |h_2|^2) s_{t,1}$$

$$\left(\frac{1}{N}R_1 o(C_N(t))^*\right) \times h_2^* + \left(\frac{1}{N}R_2 o(C_N(t))^*\right)^* \times (-h_1) = \quad \text{Eq. 14}$$
$$(|h_1|^2 + |h_2|^2) s_{t,2}$$

The above-described equations 1 through 14 prove the effect of perfect diversity caused by the JOVSF MIMO system which is used to improve performance on the Rayleigh fading channel. If any, the influence of Additive White Gaussian Noise (AWGN) is not considered in the mathematical models to describe the technology of the present invention simply.

Figure 9:
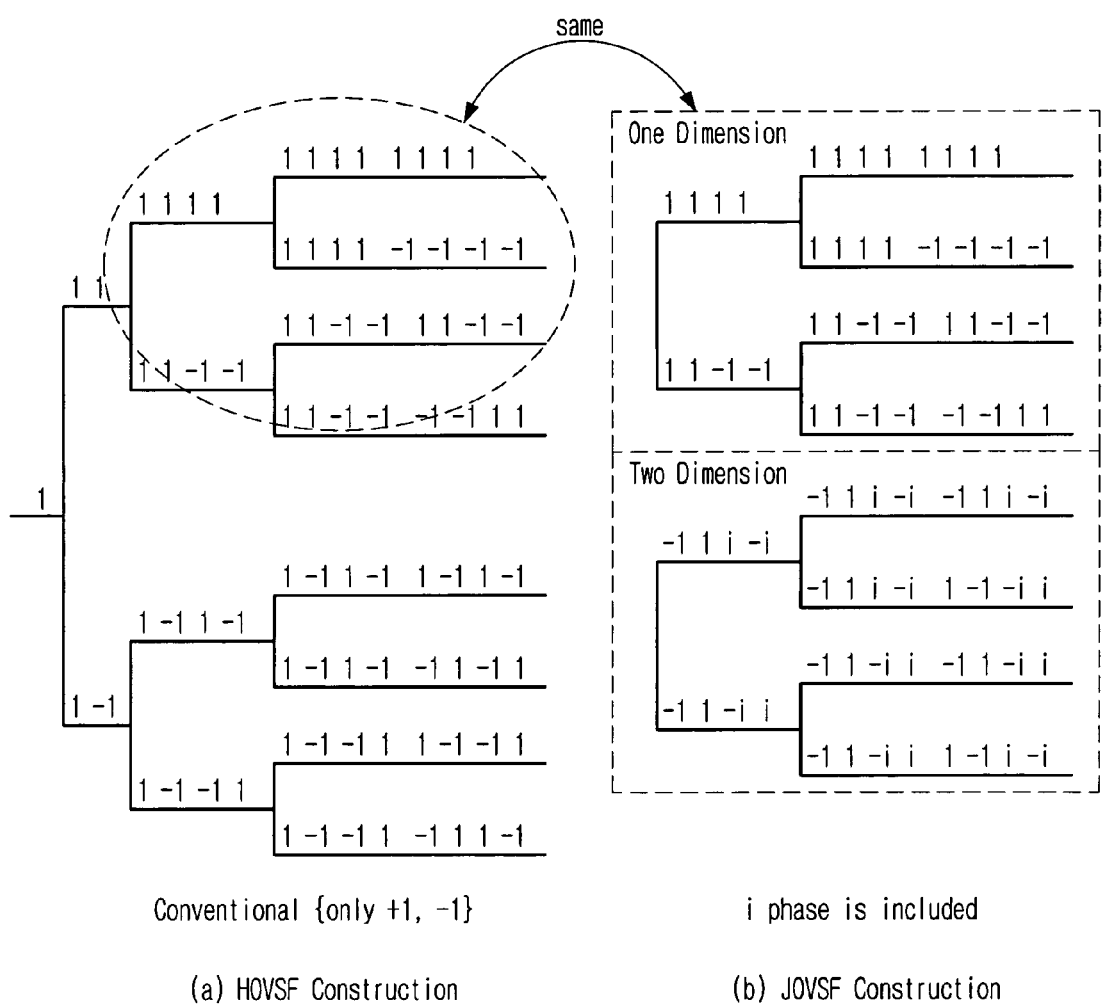
FIG. 9 is an exemplary diagram comparing the structure of a JOVSF presented in an embodiment of the present invention with the structure of a conventional Hadamard orthogonal variable spreading function (HOVSF)

FIG. 9 is an exemplary diagram comparing the structure of a JOVSF presented in an embodiment of the present invention with the structure of a conventional Hadamard Orthogonal Variable Spreading Function (HOVSF). The drawing shows seeds of the JOVSF and the conventional HOVSF and structure difference between.

As shown, the generation of the two-dimensional JOVSF suggested in the present invention is the same as the generation of an Orthogonal Variable Spreading Factor (OVSF) in an existing Hadamard matrix, that is, the HOVSF, but the seed of the code root is different. Although the HOVSF is generally a one-dimensional signal "+1," the seed of the JOVSF suggested in the present invention is formed of a two-dimensional matrix.

The generation of the two-dimensional JOVSF is the same as the generation of the OVSF in a Hadamard matrix, i.e., HOVSF, which is described in an article by F. Adachi, M. Sawahashi, and K. Okawa, entitled "Tree-structured generation of orthogonal spreading codes with different lengths for forward link of DS-CDMA mobile radio," *IEE Electronics Letters*, Vol. 33, No. 1, January 1997, pp. 27-28. However, the seed of a code root is different. Generally, a HOVSF has a root from "1" and, as illustrated, follows the Hadamard matrix. For example, the initial matrix of the HOVSF is calculated as equation 15 below.

$$C_1(1) = 1, \text{ and } \begin{bmatrix} C_1(1) \\ C_2(2) \end{bmatrix} = \begin{bmatrix} C_1(1) & C_1(1) \\ C_1(1) & \overline{C_1(1)} \end{bmatrix} = \begin{bmatrix} 1 & 1 \\ 1 & -1 \end{bmatrix} \quad \text{Eq. 15}$$

where the seed of the HOVSF is a one-dimensional signal "+1."

It is assumed that a set $\{C_N(n)\}_{n=1}^{N}$ of quadri-phase N spreading codes having a length of N chips is $C_N$. Herein, the $C_N(n)$ is a row vector having N elements, and $N=2^K$ wherein K is a positive integer. An equation 16 is created based on a $C_{N/2}$. The Kronecker operating unit 330 performed operation based on an equation 16 below to thereby generate a JOVSF.

$$\begin{bmatrix} C_N(2l-1) \\ C_N(2l) \end{bmatrix} = \begin{bmatrix} 1 & 1 \\ 1 & -1 \end{bmatrix} \otimes C_{N/2}(l) \quad \text{Eq. 16}$$

where $N \geq 8$ and $l=\{1, 2, \ldots, N/2\}$ are Kronecker operators and the seed of the JOVSF is given as an equation 17 below in the present invention.

$$[C]_4 = \begin{bmatrix} 1 & 1 & 1 & 1 \\ 1 & 1 & -1 & -1 \\ -1 & 1 & i & -i \\ -1 & 1 & -i & i \end{bmatrix} \quad \text{Eq. 17}$$

where $i=\sqrt{-1}$ and the seed is a two-dimensional matrix. Thus, the orthogonal property can be expressed as an equation 18 below.

$$[C]_4[C]_4^H = 4[I]_4 \quad \text{Eq. 18}$$

where $[C]^H$ denotes a Hermitian conjugate of a matrix $[C]$.

The seed matrix $[C]_4$ is created from a jacket matrix as described above. This is revealed in an article by Moon-Ho Lee, entitled "A new reverse jacket transform and its fast algorithm," *IEEE Trans. on Circuit and System II*, Vol. 47, No. 1, January 2000, pp. 39-47, and an article by Moon-Ho Lee, B. Sunder Rajan, and J. Y. Park, entitled "A generalized reverse jacket transform," *IEEE Trans. Circuits and System II*, Vol. 48, No. 7, 2001, pp. 684-690.

As described in FIG. 9, the seed and structure of the JOVSF is obviously different from the conventional HOVSF. For example, when l=2 and N=8, the HOVSF can be expressed as an equation 19 below based on the equation 15.

$$\begin{bmatrix} C_{N/2}(l) & C_{N/2}(l) \\ C_{N/2}(l) & \overline{C_{N/2}(l)} \end{bmatrix} = \begin{bmatrix} C_4(2) & C_4(2) \\ C_4(2) & \overline{C_4(2)} \end{bmatrix} \quad \text{Eq. 19}$$

$$= \begin{bmatrix} 1 & 1 & -1 & -1 & 1 & 1 & -1 & -1 \\ 1 & 1 & -1 & -1 & -1 & -1 & 1 & 1 \end{bmatrix}$$

$$= \begin{bmatrix} C_N(2l-1) \\ C_N(2l) \end{bmatrix}$$

$$= \begin{bmatrix} C_8(3) \\ C_8(4) \end{bmatrix}$$

Meanwhile, if l=3 and N=8, an equation 20 can be obtained based on the equation 16 in a similar method to the acquisition of the JOVSF and HOVSF.

$$\begin{bmatrix} C_N(2l-1) \\ C_N(2l) \end{bmatrix} = \begin{bmatrix} C_8(5) \\ C_8(6) \end{bmatrix} \quad \text{Eq. 20}$$

$$= \begin{bmatrix} 1 & 1 \\ 1 & -1 \end{bmatrix} \otimes C_{N/2}(l)$$

$$= \begin{bmatrix} 1 & 1 \\ 1 & -1 \end{bmatrix} \otimes C_4(3)$$

$$= \begin{bmatrix} 1 & 1 \\ 1 & -1 \end{bmatrix} \otimes [-1 \quad 1 \quad i \quad -i]$$

$$= \begin{bmatrix} -1 & 1 & i & -i & -1 & 1 & i & -i \\ -1 & 1 & i & -i & 1 & -1 & -i & i \end{bmatrix}$$

In a case that an inverse matrix of a square matrix $[A]_N = [a_{ij}]_N$ can be obtained by simply inverting each unit element, i.e., $$[A]_N^{-1} = \frac{1}{N}[1/a_{ij}]_N$$

and $1 \leq i, j \leq N$, it is called 'jacket,' herein. Other many useful matrixes, such as Hadamard matrix and DFT (DFT) matrix, can be also regarded as specific examples of the jacket matrix. This is revealed in an article by Moon-Ho Lee, B. Sunder Rajan, and J. Y. Park, entitled "A generalized reverse jacket transform," *IEEE Trans. Circuits Syst. II*, Vol. 48, No. 7, 2001, pp. 684-690.

Following is a typical jacket matrix of a fourth degree.

$$[J]_4 \triangleq \begin{bmatrix} 1 & 1 & 1 & 1 \\ 1 & i & -i & -1 \\ 1 & -i & i & -1 \\ 1 & -1 & -1 & 1 \end{bmatrix}$$

The inverse matrix of the above typical jacket matrix is shown as follows.

$$[J]_4^{-1} \triangleq \frac{1}{4}\begin{bmatrix} 1 & 1 & 1 & 1 \\ 1 & 1/i & -1/i & -1 \\ 1 & -1/i & 1/i & -1 \\ 1 & -1 & -1 & 1 \end{bmatrix}$$

Also, a root of JOVSF can be calculated as an equation 21 below.

$$[C]_4 = [P]_4^r [J]_4 [P]_4^c \quad \text{Eq. 21}$$

$$= \begin{bmatrix} 1 & 0 & 0 & 0 \\ 0 & 0 & 0 & 1 \\ 0 & 0 & 1 & 0 \\ 0 & 1 & 0 & 0 \end{bmatrix} [J]_4 \begin{bmatrix} 0 & 1 & 0 & 0 \\ 0 & 0 & 0 & 1 \\ 0 & 0 & 1 & 0 \\ 1 & 0 & 0 & 0 \end{bmatrix}$$

$$= \begin{bmatrix} 1 & 1 & 1 & 1 \\ 1 & 1 & -1 & -1 \\ -1 & 1 & i & -i \\ -1 & 1 & -i & i \end{bmatrix}$$

Where $P_N^r$ is a column substitution matrix stored in the aforementioned substitution matrix storage 313 and $P_N^c$ is a row substitution matrix.

Figure 10:
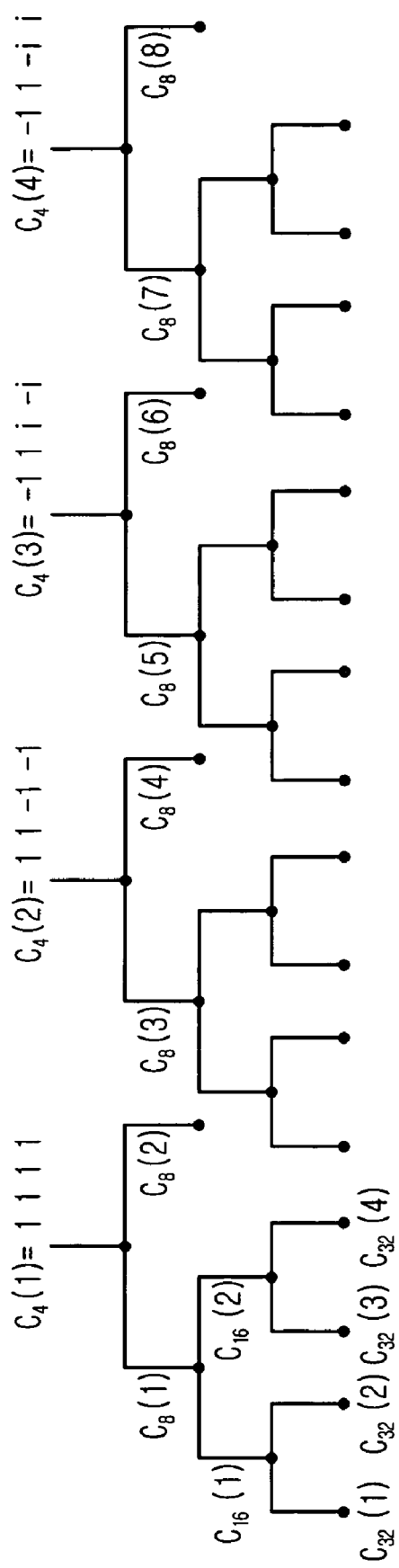
FIG. 10 is an exemplary diagram showing a JOVSF code generating tree in accordance with an embodiment of the present invention.
Figure 11A:
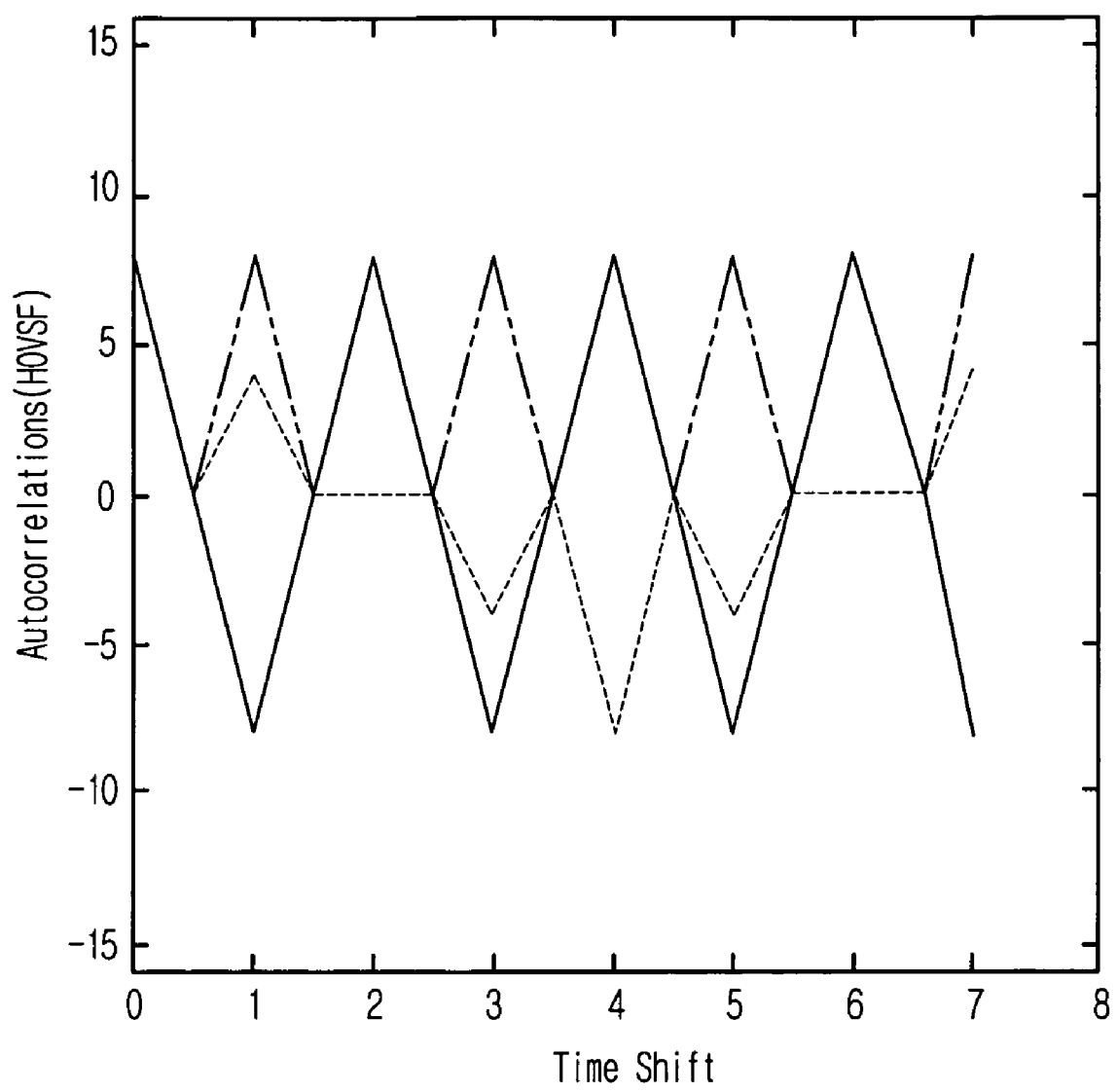
FIGS. 11A to 11D show graphs comparing periodic autocorrelations of the JOVSF suggested in the present invention with the conventional HOVSF.
Figure 11B:
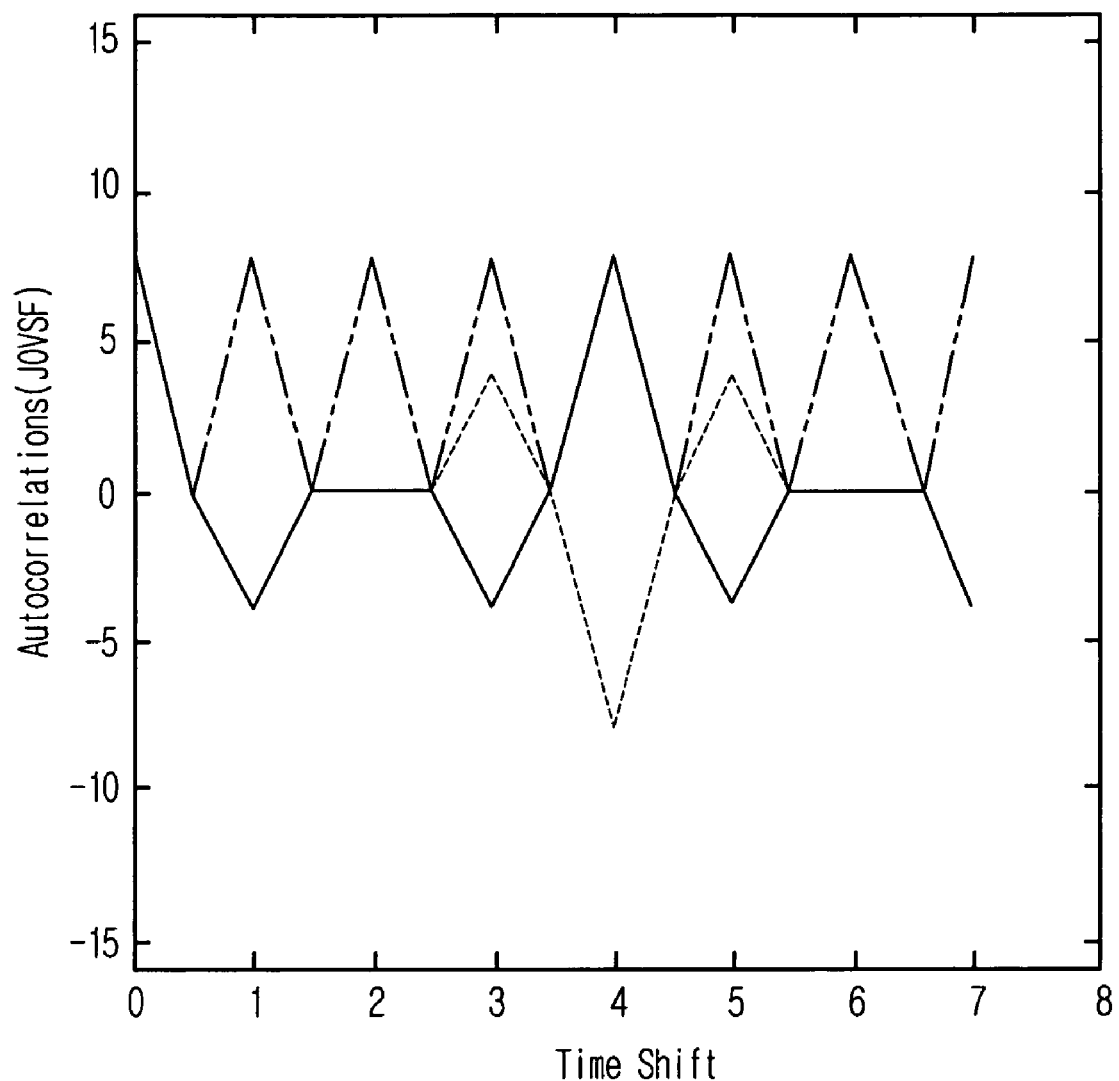
Figure 11C:
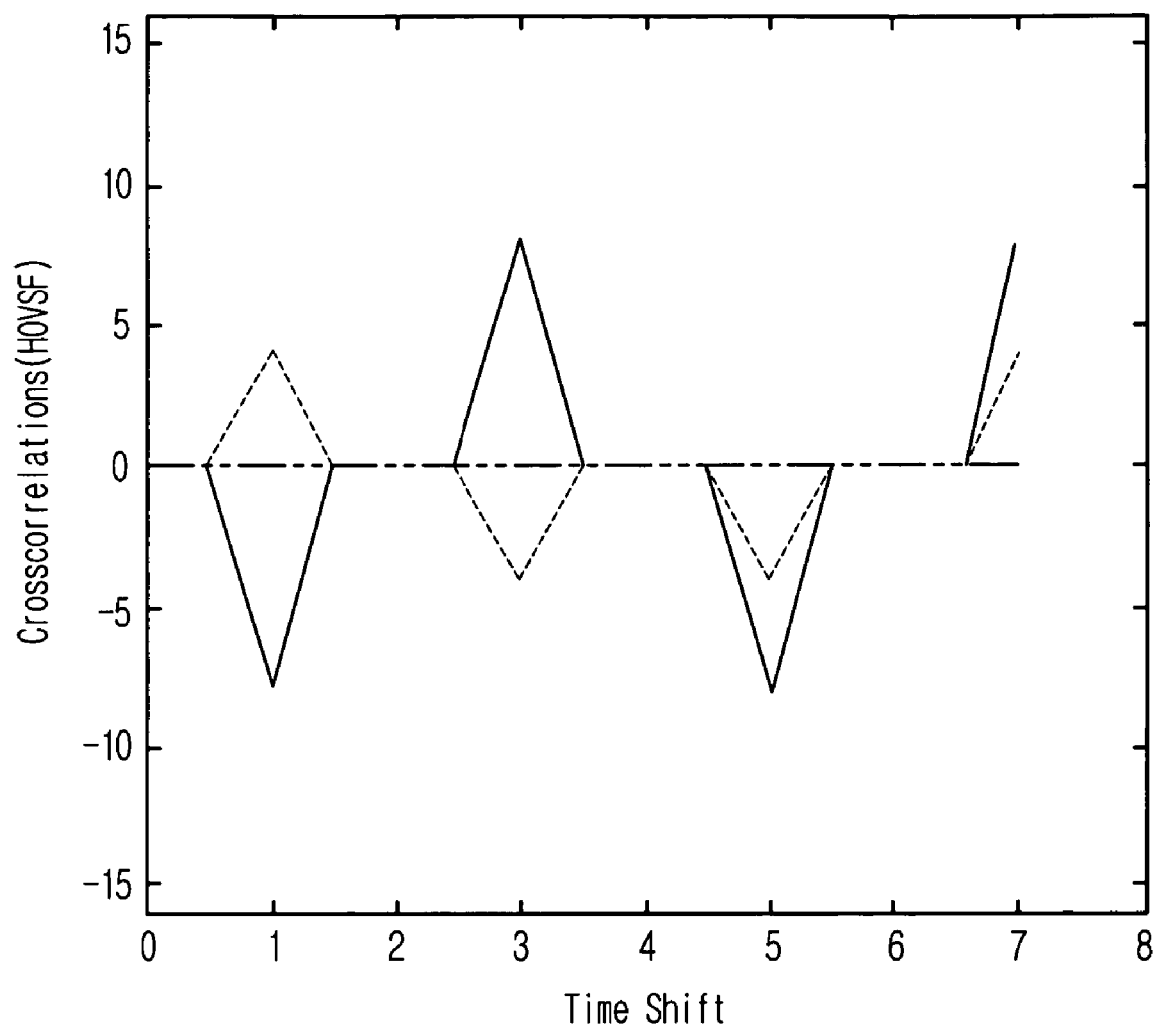
Figure 11D:
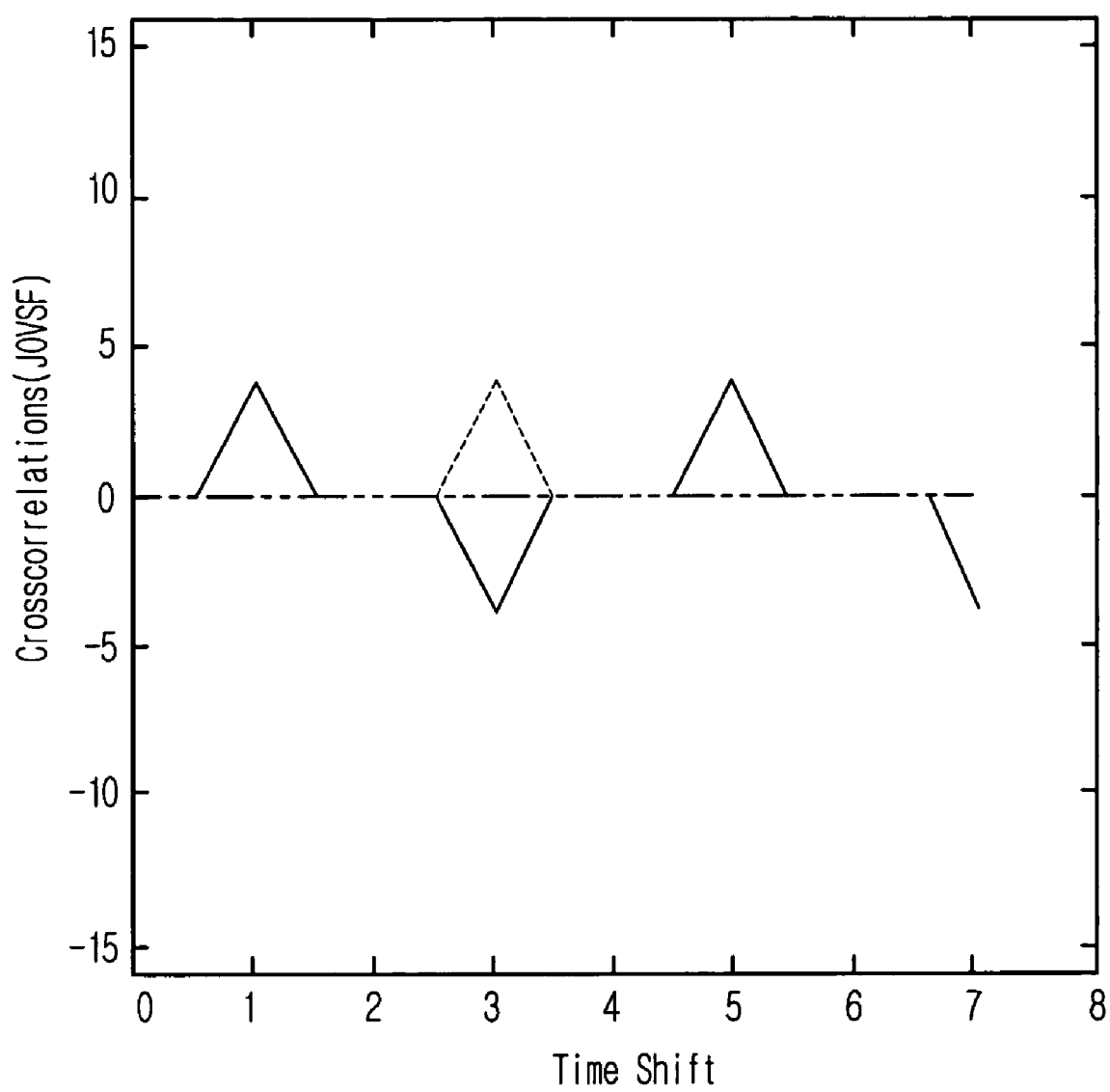

FIG. 10 is an exemplary diagram showing a JOVSF code generating tree in accordance with an embodiment of the present invention. As shown, a set of spreading codes are generated in a $k^{th}$ layer from the top starting from $C_4$, wherein k=1, 2, ..., K. The code length of the $k^{th}$ layer is $2^k$ chips, and the code of the $k^{th}$ layer can be used as a spreading code for a transmission data channel corresponding to $2^{(K-k)}$ of the minimum data rate.

It can be seen that the codes generated based on the equation 16 in the same layer are formed of a Hadamard function. Thus, the codes are orthogonal to each other. If there are two codes generated in another layer and one is not a mother code of the other code, the two codes are orthogonal to each other. This is the same as the restrictive conditions presented in an article by F. Adachi, M. Sawahashi, and K. Okawa, entitled "Tree-structured generation of orthogonal spreading codes with different lengths for forward link of DS-CDMA mobile radio," *IEE Electronics Letters*, Vol. 33, No. 1, January 1997, pp. 27-28.

The JOVSF suggested in the present invention is formed of two domains. One is based on $\{C_4(1), C_4(2)\}$ and an expansion thereof. It is formed in a conventional code designing method and it includes only $\{\pm 1\}$. The other is based on $\{C_4(3), C_4(4)\}$ including $\{\pm 1, \pm i\}$. Thus, the JOVSF of the present invention has a two-dimensional structure. The codes of different dimensions are orthogonal to each other and they have a variable data rate or a variable spreading property, which is revealed in an article by F. Adachi, M. Sawahashi and K. Okawa, entitled "Tree-structured generation of orthogonal spreading codes with different lengths for forward link of DS-CDMA mobile radio," *IEE Electronics Letters*, Vol. 33, No. 1, January 1997, pp. 27-28.

FIGS. 11A to 11D show graphs comparing periodic autocorrelations of the JOVSF suggested in the present invention with the conventional HOVSF. The periodic autocorrelation of a sequence can be defined as:

$$R_i(\tau) = \sum_{i=0}^{L-1} a_i a^*_{(i+\tau) \bmod L}$$

Also, periodic correlation can be defined as:

$$C_i(\tau) = \sum_{i=0}^{L-1} a_i b^*_{(i+\tau) \bmod L}$$

Herein, $a_i$ and $b_i$ are the $i^{th}$ element of sequences a and b and L is a length of the sequences a and b. $\tau$ is a shift coefficient and has a range of $0 \leq \tau \leq L$. The cross-correlation of HOVSF and JOVSF has an orthogonal property expressed as an equation 22 below.

$$R_i(0) = \sum_{i=0}^{L-1} a_i a^*_i = L \qquad \text{Eq. 22}$$

$$C_i(0) = \sum_{i=0}^{L-1} a_i b^*_i = 0$$

A table 1 below presents a mathematical analysis on a HOVSF and a HOVSF each having a length of 4, and a table 2 below shows a mathematical analysis on a HOVSF and a HOVSF each having a length of 8.

TABLE 1

|  | Auto-correlation | | Cross-correlation | |
| --- | --- | --- | --- | --- |
|  | Conventional HOVSF [1] | Proposed JOVSF | Conventional HOVSF [1] | Proposed JOVSF |
| Peak Value | 4 | 4 | 4 | 4 |
| Number of Peak Values | 12 | 8 | 2 | 1 |

TABLE 2

|  | Auto-correlation | | Cross-correlation | |
| --- | --- | --- | --- | --- |
|  | Conventional HOVSF [1] | Proposed JOVSF | Conventional HOVSF [1] | Proposed JOVSF |
| Peak Value | 8 | 8 | 8 | 8 |
| Number of Peak Values | 32 | 28 | 8 | 4 |

As shown in FIGS. 11A to 11D, it can be seen from the periodic auto-correlation of the HOVSF and the JOVSF that the JOVSF shows superior properties. For example, the JOVSF having a length of 4 can reduce the number of peak values of auto-correlation by a third, i.e., (12−8)/12=⅓, and reduce the number of peak values of cross-correlation by a half, which is shown in the table 1.

Also, the JOVSF having a length of 8 can reduce the number of peak values of auto-correlation by an eighth and the number of peak values of cross-correlation by a half, as well, which is shown in the table 2.

Particularly, it can be seen from the mathematical analysis that the conventional HOVSF always includes worst cases where the cross-correlation between two sequences is very bad. The worst cases are the cases $C_4(2)$ and $C_4(4)$ of the code having a length of 4 and the cases $C_8(3)$ and $C_8(7)$ of the code having a length of 8.

The above problem can be easily resolved by using the JOVSF code suggested in the present invention. When two-dimensional codes (2+2i) and (4+4i) are used, the peak values are 4 and 8, respectively. This clearly shows that low peak correlation values can be obtained by designing the JOVSF.

Figure 12:
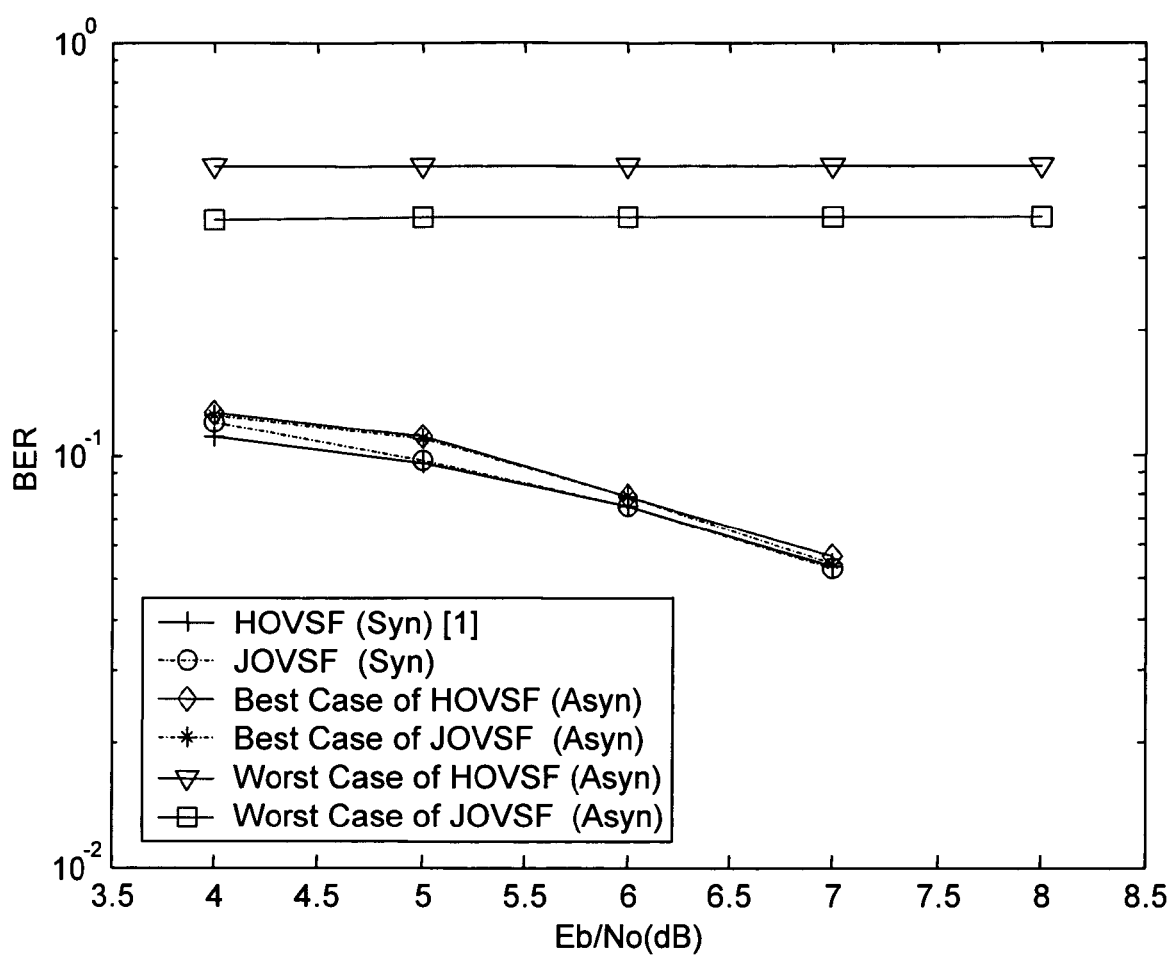
FIG. 12 is a graph comparing Bit Error Rate (BER) performance of the JOVSF suggested in the present invention with that of the conventional HOVSF.

FIG. 12 is a graph comparing Bit Error Rate (BER) performance of the JOVSF suggested in the present invention with that of the conventional HOVSF. As shown, when it is assumed that perfect synchronization is achieved, the JOVSF reveals the same bit error rate (BER) as the conventional HOVSF in the multiple user CDMA system without losing the orthogonal property.

In an asynchronous environment, the JOVSF shows a BER performance approximately 20 percent higher than the HOVSF in a worst environment. The JOVSF is formed of two domains differently from other complex spreading code, which is revealed in an article by Moon-Ho Lee, B. Sunder Rajan and J. Y. Park, entitled "A generalized reverse jacket transform," *IEEE Trans. Circuits Syst. II*, Vol. 48, No. 7, 2001, pp. 684-690.

One is a part for a binary orthogonal sequence. It is the same as the conventional HOVSF. The other is a 4-phase orthogonal complex spreading sequence and they are all orthogonal to each other.

The JOVSF and the HOVSF supports spreading of a variable transmission rate without losing the orthogonal property in the present invention. However, other complex orthogonal spreading codes may have the optimal correlation values but they do not support the variable transmission rate.

The method of the present invention can be embodied as a program and stored in a computer-readable recording medium, such as CD-ROM, RAM, ROM, floppy disks, hard disks, and magneto-optical disks. As the process can be easily implemented by those of ordinary skill in the art, further description on it will not be provided herein.

The present invention provides an MIMO system using a two-dimensional orthogonal variable spreading code, which can provide a sufficient communication capacity in an asynchronous multiple user system as well as a synchronous multiple user system by applying an orthogonal multiple code having an excellent cross-correlation property with respect to different users in a wideband CDMA (W-CDMA) system.

Also, the present invention provides a Jacket Orthogonal Variable Spreading Function (JOVSF) that can maintain an excellent correlation property without losing the orthogonal property even in a variable spreading system supporting a variable transmission rate, such as the MIMO system which requires diverse data transmission rates, a channel code spreading/despreading apparatus using the JOVSF, and an MIMO system including the channel code spreading/despreading apparatus.

In addition, the present invention can effectively reduce a peak correlation value without losing the orthogonal property, compared to a conventional HOVSF, and since it can reduce the number of peak values of cross-correlation based on increasing sequence length by a half, it is useful to detect multiple users in an asynchronous environment and reduce the level of transmission power.

The present application contains subject matter related to Korean patent application Nos. 2005-0009331 and 2005-0021139, filed with the Korean Intellectual Property Office on Feb. 2, 2005, and Mar. 14, 2005, the entire contents of which is incorporated herein by reference.

While the present invention has been described with respect to certain preferred embodiments, it will be apparent to those skilled in the art that various changes and modifications may be made without departing from the scope of the invention as defined in the following claims.

What is claimed is:

1. A Multiple Input Multiple Output (MIMO) system using a two-dimensional orthogonal variable spreading code, comprising:

a transmitting means for temporally and spatially encoding a plurality of user data, spreading the user data into orthogonal channel signals, and transmitting the orthogonal channel signals to a plurality of antennas; and a receiving means for receiving the orthogonal channel signals transmitted from the transmitting means through the antennas, and performing temporal and spatial decoding and despreading on the orthogonal channel signals, wherein the transmitting means includes:

a space time code (STC) encoding means for generating and outputting a predetermined number of STC streams by temporally and spatially encoding the user data; and a jacket orthogonal variable spreading function (JOVSF) channel code spreading means for spreading the STC streams inputted from the STC encoding means into orthogonal channel signals by using a JOVSF, which is a two-dimensional orthogonal variable spreading code;

wherein the JOVSF channel code spreading means includes;

a JOVSF generating unit for generating a JOVSF, and a JOVSF spreading unit for spreading the STC stream into orthogonal code channel signals based on the JOVSF generated in the JOVSF generating unit, wherein the JOVSF generating unit includes;

a JOVSF seed generator for generating a JOVSF seed, a JOVSF seed storage for storing the JOVSF seed, and a Kronecker operator for generating a JOVSF by performing Kronecker operation on the JOVSF seed, wherein the JOVSF seed generator includes;

a jacket matrix storage for storing a jacket matrix, a substitution matrix storage for storing a substitution matrix including a column substitution matrix and a row substitution matrix, and a seed calculator for calculating a JOVSF seed by performing multiplication on the jacket matrix and the substitution matrix, wherein the jacket matrix has a characteristic that an inverse matrix of a square matrix can be simply obtained based on inverses of unit elements of the square matrix, which is expressed as an equation:

$$[A]_N^{-1} = \frac{1}{N}[1/a_{ij}]_N, \ 1 \le i, j \le N$$

wherein the square matrix $[A]_N=[a_{ij}]_N$.

2. The MIMO system as recited in claim 1, wherein the receiving means includes:

a JOVSF channel code despreading means for despreading the orthogonal channel signals received through the antennas based on the JOVSF to thereby obtain despread signals; and an STC decoding means for performing STC decoding on the despread signals inputted from the JOVSF channel code despreading means.

3. The MIMO system as recited in claim 2, wherein the JOVSF channel code despreading means includes:

a JOVSF generating unit for generating a JOVSF; and a JOVSF despreading unit for despreading the received signals based on multiplication by the JOVSF inputted from the JOVSF generating unit.

4. The MIMO system as recited in claim 1, wherein the JOVSF spreading unit performs multiplication on the STC streams and the JOVSF.

5. The MIMO system as recited in claim 1, wherein the Kronecker operator performs Kronecker operation based on an equation expressed as:

$$\begin{bmatrix} C_N(2l-1) \\ C_N(2l) \end{bmatrix} = \begin{bmatrix} 1 & 1 \\ 1 & -1 \end{bmatrix} \otimes C_{N/2}(l)$$

where $C_N$ denotes a set ($\{C_N(n)\}_{n=1}^N$) of quadri-phase N spreading codes having a length of N chips;

$C_N(n)$ is a row vector having N elements; and $N=2^K$ where K is a positive integer.

6. The MIMO system as recited in claim 5, wherein, when N is 8, the JOVSF seed can be expressed as a two-dimensional matrix shown in an equation:

$$[C]_4 = \begin{bmatrix} 1 & 1 & 1 & 1 \\ 1 & 1 & -1 & -1 \\ -1 & 1 & i & -i \\ -1 & 1 & -i & i \end{bmatrix}$$

where $i=\sqrt{-1}$.

7. The MIMO system as recited in claim 6, wherein, when I=3 and N=8, the JOVSF can be expressed as an equation:

$$\begin{bmatrix} C_N(2l-1) \\ C_N(2l) \end{bmatrix} = \begin{bmatrix} C_8(5) \\ C_8(6) \end{bmatrix}$$
$$= \begin{bmatrix} 1 & 1 \\ 1 & -1 \end{bmatrix} \otimes C_{N/2}(l)$$
$$= \begin{bmatrix} 1 & 1 \\ 1 & -1 \end{bmatrix} \otimes C_4(3)$$
$$= \begin{bmatrix} 1 & 1 \\ 1 & -1 \end{bmatrix} \otimes [-1 \ 1 \ i \ -i]$$
$$= \begin{bmatrix} -1 & 1 & i & -i & -1 & 1 & i & -i \\ -1 & 1 & i & -i & 1 & -1 & -i & i \end{bmatrix}.$$

8. The MIMO system as recited in claim 1, wherein the JOVSF has a two-dimensional structure including a binary orthogonal sequence part and a poly-phase orthogonal complex spreading sequence part.

9. The MIMO system as recited in claim 1, wherein the transmitting means and the receiving means perform transmission and reception through a Rayleigh fading channel.

10. An apparatus for spreading a channel code by using a two-dimensional orthogonal variable spreading code, the apparatus comprising:
  a JOVSF generating means for generating a jacket orthogonal variable spreading function (JOVSF), which is a two-dimensional orthogonal variable spreading code; and
  a JOVSF spreading means for spreading a stream inputted from outside into an orthogonal code channel signal based on the JOVSF generated in the JOVSF generating means;
  wherein the JOVSF generating means includes;
  a JOVSF seed generating unit for generating a JOVSF seed,
  a JOVSF seed storing unit for storing the JOVSF seed, and
  a Kronecker operating unit for generating a JOVSF by performing Kronecker operation on the JOVSF seed,
  wherein the JOVSF seed generating unit includes;
  a jacket matrix storage for storing a jacket matrix,
  a substitution matrix storage for storing a substitution matrix including a column substitution matrix and a row substitution matrix, and
  a seed calculator for calculating a JOVSF seed by performing multiplication on the jacket matrix and the substitution matrix,
  wherein the jacket matrix has a characteristic that an inverse matrix of a square matrix can be simply obtained based on inverses of unit elements of the square matrix, which is expressed as an equation:

$$[A]_N^{-1} = \frac{1}{N} [1/a_{ij}]_N, \ 1 \le i, j \le N$$

wherein the square matrix $[A]_N = [a_{ij}]_N$.

11. The apparatus as recited in claim 10, wherein the Kronecker operating unit performs Kronecker operation based on an equation which is expressed as:

$$\begin{bmatrix} C_N(2l-1) \\ C_N(2l) \end{bmatrix} = \begin{bmatrix} 1 & 1 \\ 1 & -1 \end{bmatrix} \otimes C_{N/2}(l)$$

where $C_N$ denotes a set ($\{C_N(n)\}_{n=1}^N$) of quadri-phase N spreading codes having a length of N chips;
$C_N(n)$ is a row vector having N elements; and
$N=2^K$ where K is a positive integer.

12. The apparatus as recited in claim 11, wherein, when N is 8, the JOVSF seed can be expressed as a two-dimensional matrix shown in an equation:

$$[C]_4 = \begin{bmatrix} 1 & 1 & 1 & 1 \\ 1 & 1 & -1 & -1 \\ -1 & 1 & i & -i \\ -1 & 1 & -i & i \end{bmatrix}$$

where $i=\sqrt{-1}$.

13. The apparatus as recited in claim 12, wherein, when I=3 and N=8, the JOVSF can be expressed as an equation:

$$\begin{bmatrix} C_N(2l-1) \\ C_N(2l) \end{bmatrix} = \begin{bmatrix} C_8(5) \\ C_8(6) \end{bmatrix}$$
$$= \begin{bmatrix} 1 & 1 \\ 1 & -1 \end{bmatrix} \otimes C_{N/2}(l)$$
$$= \begin{bmatrix} 1 & 1 \\ 1 & -1 \end{bmatrix} \otimes C_4(3)$$
$$= \begin{bmatrix} 1 & 1 \\ 1 & -1 \end{bmatrix} \otimes [-1 \ 1 \ i \ -i]$$
$$= \begin{bmatrix} -1 & 1 & i & -i & -1 & 1 & i & -i \\ -1 & 1 & i & -i & 1 & -1 & -i & i \end{bmatrix}.$$

14. The apparatus as recited in claim 10, wherein the JOVSF has a two-dimensional structure including a binary orthogonal sequence part and a poly-phase orthogonal complex spreading sequence part.

15. An apparatus for despreading a channel code by using a two-dimensional orthogonal variable spreading code, comprising:
  a JOVSF generating means for generating a jacket orthogonal variable spreading function (JOVSF), which is a two-dimensional orthogonal variable spreading code; and
  a JOVSF despreading means for despreading a signal inputted from outside into an orthogonal code channel signal by multiplying the signal by the JOVSF generated in the JOVSF generating means;
  wherein the JOVSF generating means includes;
  a jacket matrix generating unit for generating a jacket matrix,
  a substitution matrix storing unit for storing a substitution matrix including a column substitution matrix and a row substitution matrix,
  a seed calculating unit for calculating a JOVSF seed by performing multiplication on the jacket matrix and the substitution matrix,
  a JOVSF seed storing unit for storing the JOVSF seed, and a Kronecker operating unit for generating a JOVSF by performing Kronecker operation on the JOVSF seed, wherein the jacket matrix has a characteristic that an inverse matrix of a square matrix can be simply obtained based on inverses of unit elements of the square matrix, which is expressed as an equation:

$$[A]_N^{-1} = \frac{1}{N}[1/a_{ij}]_N, \ 1 \le i, j \le N$$

wherein the square matrix $[A]_N = [a_{ij}]_N$.

16. The apparatus as recited in claim 15, wherein the JOVSF has a two-dimensional structure including a binary orthogonal sequence part and a poly-phase orthogonal complex spreading sequence part.

17. A method for generating a two-dimensional orthogonal variable spreading code which is used for spreading or despreading of a channel code, comprising:
   a) receiving a jacket matrix and a substitution matrix;
   b) generating a seed of a root of a jacket orthogonal variable spreading function (JOVSF), which is a two-dimensional orthogonal variable spreading code, by performing multiplication on the jacket matrix and the substitution matrix; and
   c) generating a JOVSF by receiving the JOVSF seed and performing Kronecker operation;
   wherein the jacket matrix has a characteristic that an inverse matrix of a square matrix can be simply obtained based on inverses of unit elements of the square matrix, which is expressed as an equation:

$$[A]_N^{-1} = \frac{1}{N}[1/a_{ij}]_N, \ 1 \le i, j \le N$$

wherein the square matrix $[A]_N = [a_{ij}]_N$.

18. The method as recited in claim 17, wherein the step c) includes the steps of:
   c1) determining whether a result value of the Kronecker multiplication satisfies a predetermined code length;
   c2) if the result value does not satisfy the predetermined code length, repeating the Kronecker multiplication; and
   c3) if the result value satisfies the predetermined code length, generating a JOVSF based on the result value.

19. The method as recited in claim 18, wherein the Kronecker operation is performed at the step c) based on a equation expressed as:

$$\begin{bmatrix} C_N(2l-1) \\ C_N(2l) \end{bmatrix} = \begin{bmatrix} 1 & 1 \\ 1 & -1 \end{bmatrix} \otimes C_{N/2}(l)$$

where $C_N$ denotes a set ($\{C_N(n)\}_{n=1}^{N}$) of quadri-phase N spreading codes having a length of N chips;
$C_N(n)$ is a row vector having N elements; and
$N=2^K$ where K is a positive integer.

20. The method as recited in claim 19, wherein, when N is 8, the JOVSF seed can be expressed as a two-dimensional matrix shown in an equation:

$$[C]_4 = \begin{bmatrix} 1 & 1 & 1 & 1 \\ 1 & 1 & -1 & -1 \\ -1 & 1 & i & -i \\ -1 & 1 & -i & i \end{bmatrix}$$

where $i=\sqrt{-1}$.

21. The method as recited in claim 20, wherein, when I=3 and N=8, the JOVSF can be expressed as an equation:

$$\begin{bmatrix} C_N(2l-1) \\ C_N(2l) \end{bmatrix} = \begin{bmatrix} C_8(5) \\ C_8(6) \end{bmatrix}$$
$$= \begin{bmatrix} 1 & 1 \\ 1 & -1 \end{bmatrix} \otimes C_{N/2}(l)$$
$$= \begin{bmatrix} 1 & 1 \\ 1 & -1 \end{bmatrix} \otimes C_4(3)$$
$$= \begin{bmatrix} 1 & 1 \\ 1 & -1 \end{bmatrix} \otimes [-1 \ 1 \ i \ -i]$$
$$= \begin{bmatrix} -1 & 1 & i & -i & -1 & 1 & i & -i \\ -1 & 1 & i & -i & 1 & -1 & -i & i \end{bmatrix}.$$

22. The method as recited in claim 17, wherein the JOVSF has a two-dimensional structure including a binary orthogonal sequence part and a poly-phase orthogonal complex spreading sequence part.

* * * * *